United States Patent [19]

Tanaka et al.

[11] Patent Number: 4,554,595
[45] Date of Patent: Nov. 19, 1985

[54] VIDEO SIGNAL RECORDING/REPRODUCING APPARATUS WITH CROSSTALK AND TRACKING ERROR ELIMINATION

[75] Inventors: Shunpei Tanaka; Kenji Kimura, both of Tokyo, Japan

[73] Assignee: Olympus Optical Co., Ltd., Tokyo, Japan

[21] Appl. No.: 448,786

[22] Filed: Dec. 10, 1982

[30] Foreign Application Priority Data

Dec. 15, 1981 [JP] Japan ............................ 56-201858

[51] Int. Cl.$^4$ ............................................ H04N 9/491
[52] U.S. Cl. ................................................ 358/328
[58] Field of Search ............... 358/328, 330, 310, 327

[56] References Cited

U.S. PATENT DOCUMENTS

| | | | |
|---|---|---|---|
| 4,165,518 | 8/1979 | Hirai | 358/328 |
| 4,208,673 | 6/1980 | Numakura | 358/328 X |
| 4,344,082 | 8/1982 | Ishiodori | 358/328 |

FOREIGN PATENT DOCUMENTS

0025239  2/1980  Japan ............................ 358/328

*Primary Examiner*—Aristotelis M. Psitos
*Attorney, Agent, or Firm*—Frishauf, Holtz, Goodman & Woodward

[57] ABSTRACT

A video signal recording/reproducing apparatus in which video tracks continuously arranged on a magnetic tape are sequentially and periodically classified into first to fourth tracks. A video signal is recorded on the first track such that its phase is alternately inverted for every other horizontal scanning period. A video signal is recorded on the second track such that its phase is kept noninverted. A video signal is recorded on the third track such that its phase is alternately inverted for every other horizontal scanning period in the order opposite to that in the first track. A video signal is recorded on the fourth track such that its phase is inverted. In the reproduction mode, the phases of the reproduction signals are aligned. The reproduction signal is processed together with a corresponding 1H delay signal.

11 Claims, 9 Drawing Figures

VIDEO SIGNAL RECORDING/REPRODUCING APPARATUS WITH CROSSTALK AND TRACKING ERROR ELIMINATION

BACKGROUND OF THE INVENTION

The present invention relates to a video signal recording/reproducing apparatus including means for eliminating both crosstalk and tracking error.

It has recently been desired to improve the recording density of video signals. In a home VTR, guardbands between the video tracks are eliminated, so that the video tracks are arranged adjacent to each other. When a tracking error of a reproduction head occurs in the reproduction mode, crosstalk occurs between the adjacent tracks. The crosstalk can be cancelled by a phase inverting type recording/reproducing system using correlation between the video tracks. According to this phase inverting recording/reproducing system, video signals are recorded in different phases on the adjacent video tracks. Specifically, normal video signals are recorded on first tracks (e.g., odd field tracks), whereas signals are recorded on second tracks (e.g., even field tracks) such that their phases are inverted in every 1H. In the reproduction mode, the phase of the reproduction signal recorded on the second track is inverted every 1H so as to convert it back to the normal video signal. Thereafter, the reproduction signal from the each track is synthesized with a corresponding 1H delay signal. As a result, the relationship between the phases of the signals recorded on the adjacent tracks becomes inverted, thus cancelling the crosstalk described above.

Although crosstalk can be cancelled, the tracking error is still present. For this reason, the information content of the video signal is decreased, and, inevitably, degradation of the image quality cannot be prevented. A technique has conventionally been proposed to detect and compensate for a tracking error. However, a technique has not yet been proposed to compensate for a tracking error and to cancel crosstalk.

SUMMARY OF THE INVENTION

It is an object of the present invention to provide a video signal recording/reproducing apparatus which allows quick detection of a tracking error by means of a simple construction and which also cancels crosstalk between adjacent tracks.

In order to achieve the above object of the present invention, there is provided a video signal recording/reproducing apparatus in which video tracks each comprising a predetermined number of horizontal scanning components are continuously formed on a recording medium adjacent to each other, and the horizontal scanning components are adjacent to each other between the adjacent tracks, comprising: a recording mechanism for recording video signals on video tracks arranged so as to repeat a set of first, second, third and fourth video tracks, said first video track recording the odd and even horizontal scanning components such that the phase of said odd horizontal scanning component is inverted while the phase of said even horizontal scanning component is not inverted, said second video track recording a supplied video signal thereon, said third video track recording odd and even horizontal scanning components such that a phase of said odd horizontal scanning component is not inverted while a phase of said even horizontal scanning component is inverted, and said fourth video track recording an inverted video signal; and a reproduction mechanism for subjecting reproduction signals to a predetermined phase conversion so as to align phases of the reproduction signals from the video tracks, and for producing as a reproduction signal a sum signal of a reproduction signal and a corresponding 1H delay signal, and as a tracking error signal a subtraction signal of the reproduction signal minus the corresponding 1H delay signal.

DETAILED DESCRIPTION OF THE PREFERRED EMBODIMENT

Figure 1:
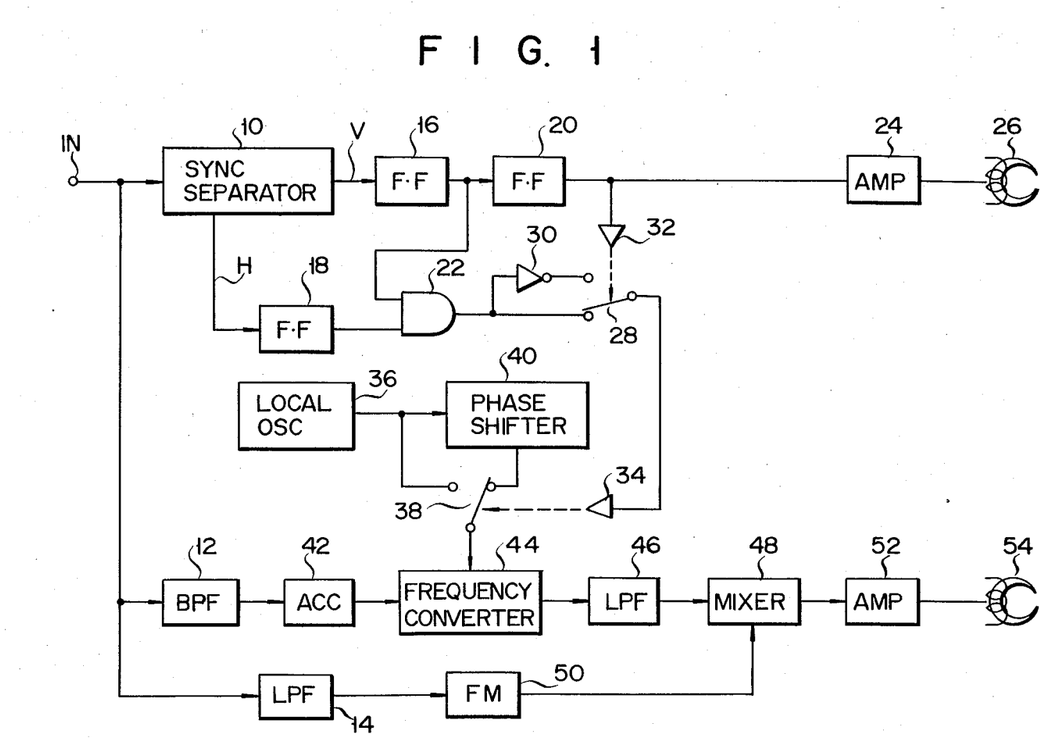
FIG. 1 is a block diagram of a recording mechanism of a video signal recording/reproducing apparatus according to an embodiment of the present invention.
Figure 2:
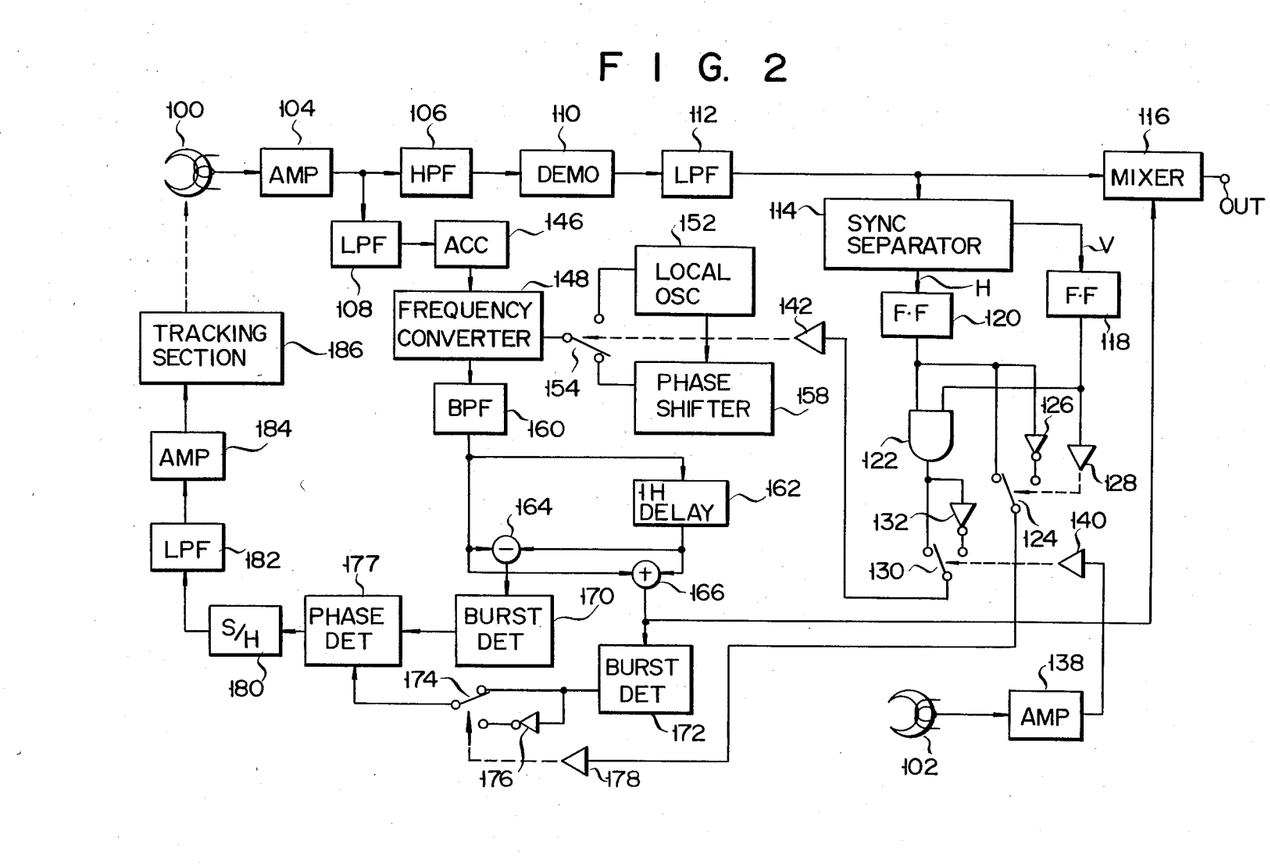
FIG. 2 is a block diagram of a reproduction mechanism of the video signal recording/reproducing apparatus shown in FIG. 1.

A video signal recording/reproducing apparatus according to an embodiment of the present invention will be described with reference to the accompanying drawings. FIGS. 1 and 2 are block diagrams of recording and reproduction mechanisms, respectively. In the recording mechanism, a video signal input end IN is connected to a synchronizing signal separator 10, a band-pass filter 12, and a low-pass filter 14. An NTSC signal or the like which comprises a synchronizing signal, a luminance signal and a chrominance signal is supplied to the input end IN. The vertical and horizontal synchronizing signals separated by the synchronizing signal separator 10 are supplied to flip-flops 16 and 18, respectively. An output from the flip-flop 16 is supplied to a flip-flop 20 and to the first input end of an AND gate 22. An output from the flip-flop 20 is supplied to a control head 26 through an amplifier 24, so that the output is recorded on a control track disposed along one side of a magnetic tape. An output from the flip-flop 18 is supplied to the second input end of the AND gate 22. An output from the AND gate 22 is then supplied to the first contact of a switch 28, and to a second contact of the switch 28 through an inverter 30. The switch 28 is controlled by an actuator 32 connected to the output end of the flip-flop 20. When the actuator 32 receives a signal of logic level "1", it selects a signal on the side of the first contact of the switch 28, i.e., the output signal from the AND gate 22. The output from the switch 28 is then supplied to an actuator 34. An output signal from a local oscillator 36 is supplied to the first contact of a switch 38 and to the second contact of the switch 38 through a phase shifter 40 having a shift constant $\pi$. When the actuator 34 receives a signal of logic level "1", it selects a signal on the side of the second contact of the switch 38, i.e., a phase-inverted local oscillation signal.

A frequency component having a bandwidth of 3.58 MHz±500 kHz passes through the band-pass filter 12. Since the chrominance signal is generally obtained by subjecting a subcarrier wave having a frequency of 3.58 MHz to quadrature two phase modulation, it is sufficient for the subcarrier to have a bandwidth of ±500 kHz. The amplitude of an output chrominance signal from the band-pass filter 12 is adjusted to have a reference level by an automatic color control circuit 42. An output from the automatic color control circuit 42 is supplied to a frequency converter 44. The frequency converter 44 converts a chrominance subcarrier signal having a frequency of 3.58 MHz to a color-under signal having a frequency of around 700 kHz so as to perform excellent recording in a narrow bandwidth. The frequency converter 44 subjects the output from the automatic color control circuit 42 and the output from the local oscillator 36 to heterodyne detection. The local oscillation frequency is the sum of the chrominance subcarrier frequency (3.58 MHz) and the color-under signal frequency (0.688 MHz). The output from the local oscillator 36 and its inverted signal are selectively supplied by the switch 38 to the frequency converter 44 so as to control the phase of the video signal recorded for each horizontal scanning component. The phase of the local oscillation signal corresponds to that of the color-under signal. The output from the frequency converter 44 is supplied to the first input end of a mixer 48 through a low-pass filter 46. The low-pass filter 46 is arranged to eliminate a vestigial frequency component produced when frequency conversion is performed.

The low-pass filter 14 serves to extract the luminance signal from the video signal such as the NTSC signal. The luminance signal from the low-pass filter 14 is supplied to the second input end of the mixer 48 through a frequency modulator 50. An output from the mixer 48 is supplied to a recording head 54 through an amplifier 52. Slanted recording tracks are formed on the magnetic tape. Signals of each field are recorded on each track. A single head is illustrated as the recording head 54 in FIG. 1. However, a plurality of heads may be disposed to select a proper head for a corresponding track.

In the reproduction mechanism shown in FIG. 2, two heads, i.e., a reproduction head 100 and a control head 102 are arranged in the same manner as in the recording mechanism. However, these heads may also be selectively used as heads in the recording mechanism. An output from the reproduction head 100 is supplied to a high-pass filter 106 and to a low-pass filter 108 through an amplifier 104. The high-pass filter 106 selects the luminance signal component (FM signal component). An output from the high-pass filter 106 is supplied to a synchronizing signal separator 114 and a mixer 116 through a frequency demodulator 110 and a low-pass filter 112. The low-pass filter 112 serves to extract the luminance signal component from an FM carrier component. The vertical and horizontal synchronizing signals separated by the synchronizing signal separator 114 are supplied to flip-flops 118 and 120, respectively. An output from the flip-flop 120 is supplied to the first input end of an AND gate 122, to the first contact of a switch 124, and to the input end of an inverter 126. An output from the inverter 126 is supplied to the second contact of the switch 124. An output from the flip-flop 118 is supplied to the second input end of the AND gate 122 and to an actuator 128. When the actuator 128 receives a signal of logic level "1", it causes the switch 124 to switch to the first contact as shown in FIG. 2, i.e., it causes the switch 124 to receive the output from the flip-flop 120. The output from the AND gate 122 is supplied to the first contact of a switch 130, and to the second contact of the switch 130 through an inverter 132. An output signal from the control head 102 is supplied to an actuator 140 through an amplifier 138. The actuator 140 serves to control the switch 130. When the actuator 140 receives a signal of logic level "1", it causes the switch 130 to switch to the first contact, i.e., it causes the switch 130 to receive the output from the AND gate 122. An output signal from the switch 130 is supplied to an actuator 142.

The low-pass filter 108 serves to extract the color-under signal. An output signal from the low-pass filter 108 is shaped by an automatic color control circuit 146. An output from the automatic color control circuit 146 is supplied to a frequency converter 148. The frequency converter 148 serves to convert the color-under signal to the chrominance subcarrier signal having a frequency of 3.58 MHz. The frequency converter 148 selectively receives one of the outputs from a local oscillator 152 and its inverted signal. An output from the local oscillator 152 is supplied to the first contact of a switch 154 without any modification. The output from the local oscillator is also supplied to a phase shifter 158 having a shift constant $\pi$, and is then supplied to the second contact of the switch 154. The switch 154 is controlled by the actuator 142. When the actuator 142 receives a signal of logic level "1", it causes the switch 154 to couple its second contact and its output contact, i.e., it causes the switch 154 to receive the output from the phase shifter 158. An output from the frequency converter 148 is supplied to the (−) input end of a subtracter 164 and to the first input end of an adder 166 through a band-pass filter 160 and a 1H delay line 162.

The output from the band-pass filter 160 is supplied to the (+) input end of the subtracter 164 and to the second input end of the adder 166. The band-pass filter 160 extracts only the chrominance subcarrier signal. An output from the adder 166 is supplied to the mixer 116 and is mixed with the luminance signal component. The mixed signal is then supplied to a video signal output end OUT. Output signals from the subtracter 164 and the adder 166 are supplied to burst detectors 170 and 172, respectively. An output signal from the burst detector 172 is supplied to the first contact of a switch 174 and to the second contact of the switch 174 through an inverter 176. Output signals from the switch 174 and the burst detector 170 are supplied to a phase detector 177. The switch 174 is controlled by an actuator 178 which receives the output from the switch 124. When a signal of logic level "1" is supplied to the actuator 178, the switch 174 is set to the first contact thereof, i.e., it receives the output from the burst detector 172. An output from the phase detector 177 is supplied to a tracking section 186 through a sample/hold circuit 180, a low-pass filter 182 and an amplifier 184.

Figures 3, 4, 5A, 5B:
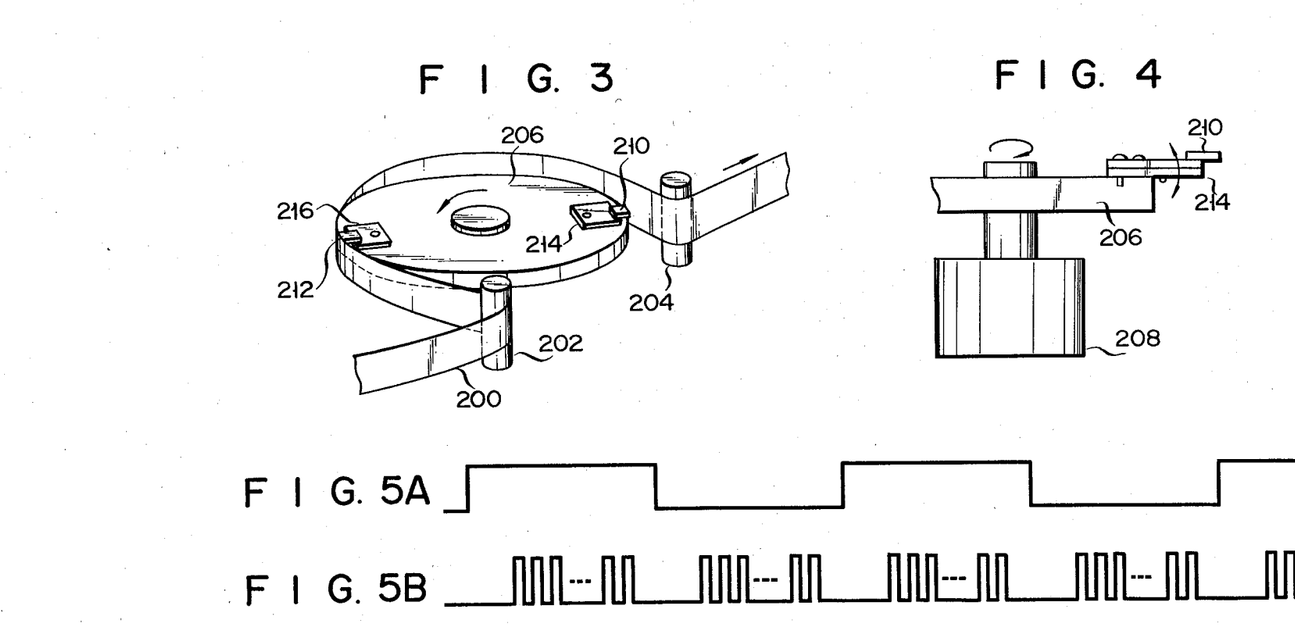
FIG. 3 is a perspective view of a tracking section shown in FIG. 2.
FIG. 4 is a front view of the tracking section shown in FIG. 2.
FIGS. 5A to 5D are timing charts for explaining the operation of the recording mechanism shown in FIG. 1.

The tracking section 186 is arranged in a manner shown in FIGS. 3 and 4; FIG. 3 is a perspective view and FIG. 4 is a front view thereof. A magnetic tape 200 is guided by guide posts 202 and 204 and is wound around a rotary cylinder 206. The rotary cylinder 206 is driven by a motor 208. Referring to FIG. 3, two recording/reproducing magnetic heads 210 and 212 are arranged. The magnetic heads 210 and 212 are mounted on the rotary cylinder 206 by deflectors 214 and 216 comprising bimorph elements or the like, respectively. The deflectors 214 and 216 are deflected to an extent corresponding to the amplitude of a voltage applied thereto in the direction in accordance with the polarity of the voltage. The deflectors 214 and 216 thus adjust a tracking error. The output from the amplifier 184 in the reproduction mechanism is supplied to the deflectors 214 and 216.

Figure 5C:
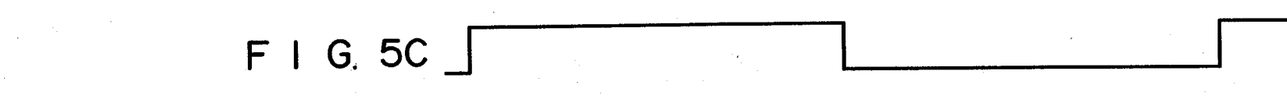
Figure 5D:
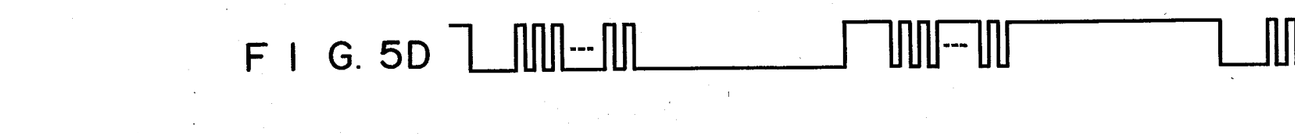
Figure 6:
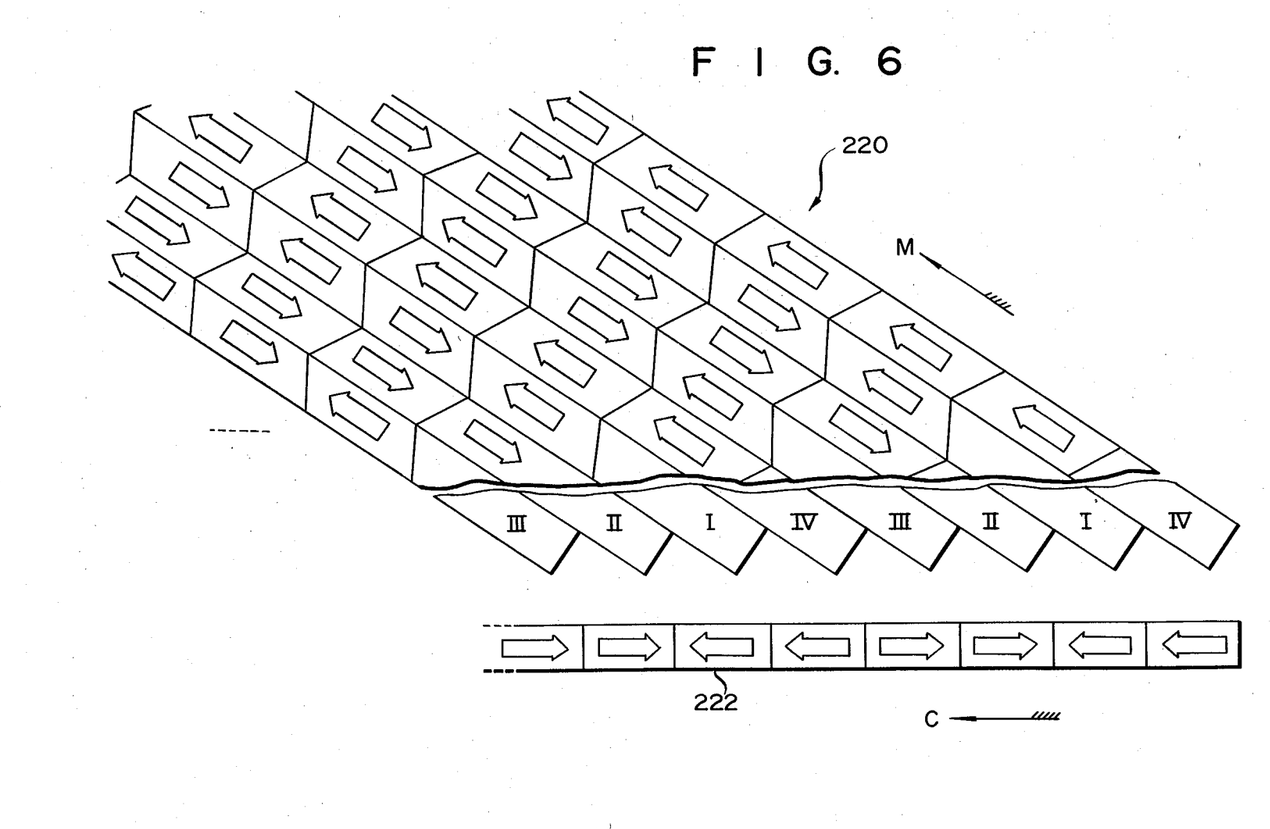
FIG. 6 shows the phases of the recording signals recorded on a magnetic tape.

The mode of operation of the recording mechanism will be described with reference to the timing charts shown in FIGS. 5A to 5D. When the NTSC signal is supplied to the input end IN, the vertical synchronizing signal of each field is supplied to the flip-flop 16, while the horizontal synchronizing signal of one field is supplied to the flip-flop 18. The flip-flops 16 and 18 produce, by ½ frequency division, vertical and horizontal synchronizing signals as shown in FIGS. 5A and 5B, respectively. The flip-flop 20 produces by ¼ frequency division a vertical synchronizing signal, as shown in FIG. 5C. In response to the output from the flip-flop 20, the switch 28 selects the output from the AND gate 22 during a time interval corresponding to every first two fields out of each set of four fields. The switch 28 selects the inverted output produced from the AND gate 22 during a time interval corresponding to every last two fields out of each set of four. As a result, the output from the switch 28 is obtained as a periodic signal in units of four fields, as shown in FIG. 5D. In response to the output signal from the switch 28, the actuator 34 controls the switch 38 so as to change over the phase angle between 0° and 180° of the local frequency signals supplied to the frequency converter 44. When the phase of the local frequency signal is changed over, the phase of the color-under signal is changed over accordingly. The color-under signal is recorded by the head 26 on the control track. In this condition, when the actuator 34 receives a signal of logic level "1", the switch 38 is switched to the phase shifter 40. Therefore, the logic levels "1" and "0" of the signal shown in FIG. 5D respectively correspond to phases 180° (inverted) and 0° (no phase shift) of the color-under signal. The chrominance signal from the frequency converter 44 and the luminance signal from the frequency demodulator 50 are mixed by the mixer 48. The composite video signal thus obtained is recorded by the recording head 54 on the video track of the magnetic tape. When each video track is assigned to a one-field chrominance subcarrier signal, the relationship between the signal components recorded on the magnetic tape is obtained, as shown in FIG. 6. Video tracks 220 are scanned with the recording head (this is also the case of the reproduction head) in the direction indicated by arrow M. A control track 222 is scanned with the control head in the direction indicated by arrow C. Specifically, the video tracks 220 are formed inclined along the magnetic tape, while the control track 222 is formed along the magnetic tape. A zone of the video track corresponds to 1H, and the directions of hollow arrows respectively indicate phases. The video tracks 220 have four types of recording patterns (with respect to the phase). The same recording pattern is repeated every set of four tracks (i.e., four fields). Signals are recorded on a first track I such that their phases are changed over from 180° to 0° in every 1H. Signals, phases of which are all set to 0°, are recorded on a second track II. Signals are recorded on a third track III such that their phases are changed over from 0° to 180° every 1H in the opposite manner to that in the first track I. Signals, phases of which are all set to 180°, are recorded on a fourth track IV in the opposite manner to that of the second track II. Any given 1H signal in a field has a phase opposite to that in the next field but one. One zone of the control track 222 corresponds to one field interval. The phase of the signals recorded on the control track 222 is inverted in units of two fields.

The mode of operation of the reproduction mechanism will be described hereinafter. The reproduction and recording mechanisms have the same circuit arrangement portion from the synchronizing signal separator to the frequency converter, so that the output from the frequency converter 148 in the reproduction mechanism corresponds to a signal which is phase shifted by the recording mechanism and which is phase shifted again to obtain the original signal status, i.e., to a chrominance subcarrier signal which corresponds to the NTSC signal having a phase angle of 0°. As described with reference to the recording mechanism, the phase of the local frequency signal in every 1H in each field is controlled to perform this phase shift. A local frequency signal which allows the phase angle of the 1H signal in a given field to be set at 0° does not always set the phase angle of the signals adjacent to the given field to 0°. The phases of the crosstalk components caused by a tracking error are not aligned at 0°, which will be described with reference to Tables 1 and 2. Table 1 shows reproduction signals (before the phases of these signals are inverted again to have the initial phase status) for every 1H. A plus (+) mark indicates a phase angle of 0°, whereas a minus (−) mark indicates a phase angle of 180°.

TABLE 1

| Track | Reproduction Signal |
|---|---|
| I | − + − + − + − ... |
| II | + + + + + + + ... |
| III | + − + − + − + ... |
| IV | − − − − − − − ... |

The signals are shifted in phase for every track so as to align their phases at 0°. The crosstalk components are shown in Table 2. An upper item of a column for a given track indicates crosstalk components from a field immediately before a given track, whereas a lower item indicates crosstalk components from a field immediately after the given track.

TABLE 2

| Track | | Crosstalk |
|---|---|---|
| I | I(IV) | + − + − + − + ... |
|  | I(II) | − + − + − + − ... |
| II | II(I) | − + − + − + − ... |
|  | II(III) | + − + − + − + ... |
| III | III(II) | + − + − + − + ... |
|  | III(IV) | − + − + − + − ... |
| IV | IV(III) | − + − + − + − ... |
|  | IV(I) | + − + − + − + ... |

As may be apparent from Table 2, the crosstalk components (from the field immediately before and after the given field) have inverted phases in every 1H. Therefore, when the crosstalk components in every 1H are added to those after 1H, they are cancelled. The summation is performed by the adder 166 in the circuit shown in FIG. 2. Specifically, the output from the frequency converter 148 and the corresponding 1H delay signal are supplied to the adder 166, so that the crosstalk component is cancelled. Since the reproduction signals for every 1H have the same phase, the adder 166 produces only the chrominance subcarrier signal component from which the crosstalk component is eliminated. The chrominance subcarrier signal is mixed with the luminance signal by the mixer 116. The composite video signal is then produced as the NTSC signal at the output end OUT. According to the above embodiment, the crosstalk components are cancelled utilizing a correlation between the adjacent tracks.

As described above, the phases of the signal components for every 1H are the same, while the phases of the crosstalk components are different from each other. When the 1H delay signal corresponding to each 1H signal is subtracted therefrom, the signal component is 0 and only the crosstalk components remain. The phases indicating derivatives in crosstalk components are obtained from the subtracter 164, as shown in Table 3. An upper item of a column of a given track indicates crosstalk components from a field immediately before the given track, whereas a lower item indicates crosstalk components from a field immediately after the given track.

TABLE 3

| Track | | Derivative of Crosstalk |
|---|---|---|
| I | I(IV) | + − + − + − + ... |
|  | I(II) | − + − + − + − ... |
| II | II(I) | − + − + − + − ... |
|  | II(III) | + − + − + − + ... |
| III | III(II) | + − + − + − + ... |
|  | III(IV) | − + − + − + − ... |
| IV | IV(III) | − + − + − + − ... |
|  | IV(I) | + − + − + − + ... |

As may be apparent from Table 3, the phases of the output signals from the subtracter 164 are determined in accordance with the type of track, the type of horizontal scanning component, and the direction of the tracking error. When the type of track (one of tracks I to IV) and the type of horizontal scanning component (one of odd and even scanning components) are specified, the signal can be used as a tracking error signal. The amplitude of the output signal from the subtracter 164 is determined in accordance with an amount of error. In the above embodiment, the color burst signal inserted for every 1H is used as the tracking error signal. The phase and amplitude of the color burst signal are detected by the phase detector 177. The detected signal is then supplied to the tracking section 186. When the reference signal supplied to the phase detector 117 has a proper phase, the phase detector 117 will generate output signals the phase of which is determined only by the direction of tracking error. In this embodiment, the color burst signal extracted from the output from the adder 166 is inverted for every 1H, the inverting manner being inverted for every field. Since the output of the burst detector 172 is used as the reference signal, the phase of the output from the phase detector 177 can be determined in accordance with the direction of the tracking error. The output signal from the phase detector 177 is supplied to the deflectors 214 and 216 of the tracking section 186 through the sample/hold circuit 180, the low-pass filter 182 and the amplifier 184. As a result, the tracking error of the head can be corrected.

As described above, according to this embodiment, the relationship between the recording phases for every 1H of the adjacent tracks is periodically changed, so that the crosstalk components cancel each other. At the same time, the direction and amount of the tracking error can be detected.

The present invention is not limited to the above embodiment. Various changes and modifications concerning a phase shifting means for forming four recording patterns and its reverse converting means may be made within the spirit and scope of the present invention.

What we claim is:

1. A video signal recording apparatus with crosstalk and tracking error elimination, in which a plurality of video tracks each having a predetermined number of horizontal scanning components are formed on a recording medium adjacent to each other, comprising:

separating means for separating horizontal and vertical synchronizing signals from an input video signal having a chrominance signal;

phase controlling means coupled to receive said input video signal, and including means for periodically and sequentially changing the phase of said chrominance signal in response to said horizontal and vertical synchronizing signals, and means for periodically forming first to fourth recording patterns from said changed phase chrominance signal, said first recording pattern having odd horizontal scanning components, a phase of which is inverted, and even horizontal scanning components, a phase of which is kept noninverted, said second recording pattern having a phase noninverted, said third recording pattern having odd horizontal scanning components, a phase of which is kept noninverted, and even horizontal scanning components, a phase of which is inverted, and said fourth recording pattern having a phase which is inverted; and means coupled to said phase controlling means for recording an output signal from said phase controlling means, such that said first to fourth recording patterns are recorded on the respective adjacent video tracks of said recording medium.

2. The video signal recording apparatus of claim 1, wherein said phase controlling means comprises:

first and second frequency dividing means for receiving said vertical and horizontal synchronizing signals from said separating means, respectively;

an AND gate coupled to receive outputs from said first and said second frequency dividing means;

third frequency dividing means for receiving the output from said first frequency dividing means;

an inverter for inverting an output from said AND gate;

switching means for selectively producing the output from said AND gate and the output from said inverter in response to an output from said third frequency dividing means;

a local oscillator;

a phase shifter for inverting the phase of the output signal from said local oscillator; and frequency converting means, including heterodyne detection means, for heterodyning said chrominance signal and one of the output from said local oscillator and the output from said phase shifter in response to the output from said switching means, and for providing a corresponding changed phase chrominance signal output.

3. A video signal reproducing apparatus with crosstalk and tracking error elimination, comprising:

reproducing means for detecting a video signal recorded on a recording medium and for generating an output signal including a phase-changed chrominance signal;

separating means for separating horizontal and vertical synchronizing signals from said output signal from said reproducing means;

phase controlling means coupled to receive said output signal, and including means for periodically and sequentially changing the phase of said phase-changed chrominance signal in response to said horizontal and vertical synchronizing signals, and means for periodically reproducing first to fourth chrominance signals which form the phase-changed chrominance signal on the recording medium, said first reproduced chrominance signal having odd horizontal scanning components, a phase of which is inverted, and even horizontal scanning components, a phase of which is kept noninverted, said second reproduced chrominance signal having a phase noninverted, said third reproduced chrominance signal having odd horizontal scanning components, a phase of which is kept noninverted, and even horizontal scanning components, a phase of which is inverted, and said fourth reproduced chrominance signal having a phase which is inverted;

delaying means coupled to said phase controlling means for delaying the reproduced chrominance signals from said phase controlling means for one horizontal scanning period;

means for producing a reproducing signal by adding said reproduced chrominance signals from said phase controlling means and the output from said delaying means;

subtracting means for subtracting the output of said delaying means from the reproduced chrominance signals from said phase controlling means;

phase detector means for detecting the phase and the amplitude of the output from said subtracting means; and means coupled to said reproducing means for performing tracking correction of said reproducing means in response to the output from said phase detector means.

4. The video signal reproducing apparatus of claim 3, wherein said phase controlling means comprises:

first and second frequency dividing means for receiving the vertical and horizontal synchronizing signals from said separating means, respectively;

and AND gate coupled to receive outputs from said first and said second frequency dividing means;

an inverter for inverting the output signal from said AND gate;

switching means for selectively producing the output from said AND gate and the output from said inverter in response to a control signal which inverts at a timing of every two successive ones of said first to fourth reproduced chrominance signals;

a local oscillator;

a phase shifter for inverting the phase of the output signal from said local oscillator; and frequency converting means, including heterodyne detection means, for heterodyning said reproduced chrominance signals and one of the output from said local oscillator and the output from said phase shifter in response to the output from said switching means.

5. A video signal recording/reproducing apparatus with crosstalk and tracking error elimination, in which a plurality of video tracks each having a predetermined number of horizontal scanning components are formed on a recording medium adjacent to each other, comprising:

video signal recording means including:

first separating means for separating horizontal and vertical synchronizing signals from an input video signal having a chrominance signal;

first phase controlling means coupled to receive said input video signal, and including means for periodically and sequentially changing the phase of said chrominance signal in response to said horizontal and vertical synchronizing signals, and means for periodically forming first to fourth recording patterns from said changed phase chrominance signal, said first recording pattern having odd horizontal scanning components, a phase of which is inverted, and even horizontal scanning components, a phase of which is kept noninverted, said second recording pattern having a phase noninverted, said third recording pattern having odd horizontal scanning components, a phase of which is kept noninverted, and even horizontal scanning components, a phase of which is inverted, and said fourth recording pattern having a phase which is inverted; and means coupled to said first phase controlling means for recording an output signal from said first phase controlling means, such that said first to fourth recording patterns are recorded on the respective adjacent video tracks of said recording medium; and video signal reproducing means including:

reproducing means for detecting a video signal recorded on said recording medium and for generating an output signal including said changed phase chrominance signal;

second separating means for separating horizontal and vertical synchronizing signals from said output signal from said reproducing means;

second phase controlling means coupled to receive said output signal, and including means for periodically and sequentially changing the phase of said changed phase chrominance signal in response to said horizontal and vertical synchronizing signals separated by said second separating means, and means for periodically reproducing first to fourth chrominance signals from said first to fourth recording patterns on said recording medium, said first reproduced chrominance signal having odd horizontal scanning components, a phase of which is inverted, and even horizontal scanning components, a phase of which is kept noninverted, said second reproduced chrominance signal having a phase noninverted, said third reproduced chrominance signal having odd horizontal scanning components, a phase of which is kept noninverted, and even horizontal scanning components, a phase of which is inverted, and said fourth reproduced chrominance signal having a phase which is inverted;

means coupled to said second phase controlling means for delaying a reproduced chrominance signal output from said second phase controlling means for one horizontal scanning period;

means for producing a reproducing signal by adding a reproduced chrominance signal output from said second phase controlling means and the output from said delaying means;

subtracting means for subtracting the output of said delaying means from the output of said second phase controlling means;

phase detector means for detecting the phase and the amplitude of the output from said subtracting means; and means coupled to said reproducing means for performing tracking correction of said reproducing means in response to the output from said phase detector means.

6. The video signal recording/reproducing apparatus of claim 5, wherein:

said first phase controlling means comprises:

first and second frequency dividing means for receiving said vertical and horizontal synchronizing signals from said first separating means, respectively;

a first AND gate coupled to receive outputs from said first and said second frequency dividing means;

third frequency dividing means for receiving the output from said first frequency dividing means;

a first inverter for inverting an output from said first AND gate;

first switching means for selectively producing the output from said first AND gate and the output from said first inverter in response to an output from said third frequency dividing means;

a first local oscillator;

a first phase shifter for inverting the phase of the output signal from said first local oscillator; and first frequency converting means, including heterodyne detection means, for heterodyning said chrominance signal and one of the output from said first local oscillator and the output from said first phase shifter in response to the output from said first switching means, and for providing a corresponding changed phase chrominance signal output; and said second phase controlling means comprises:

first and second additional frequency dividing means for receiving the vertical and horizontal synchronizing signals from said second separating means, respectively;

a second AND gate coupled to receive outputs from said first and said second additional frequency dividing means;

a second inverter for inverting the output signal from said second AND gate;

second switching means for selectively producing the output from said second AND gate and the output from said second inverter in response to a control signal which inverts at a timing of every two successive ones of said first to fourth reproduced chrominance signals;

a second local oscillator;

a second phase shifter for inverting the phase of the output signal from said second local oscillator; and second frequency converting means, including heterodyne detection means, for heterodyning said changed phase chrominance signal and one of the output from said second local oscillator and the output from said second phase shifter in response to the output from said second switching means.

7. A tracking control system for a recording apparatus wherein a plurality of video tracks each having a predetermined number of horizontal scanning components are formed on a recording medium adjacent to each other, comprising:

means for separating horizontal and vertical synchronizing signals from an input video signal having a chrominance information signal;

phase controlling means for periodically and sequentially changing the phase of the chrominance information signal extracted from the input video signal and for producing corresponding output signals, the phase changing operation being performed in response to said horizontal and vertical synchronizing signals to form four types of recording signals to be recorded on corresponding first to fourth tracks which are periodically repeated in sequence every set of four video tracks on said recording medium, wherein said first track has odd horizontal scanning components, the phase of which is inverted and even horizontal scanning components, the phase of which is kept noninverted, said second track has a phase which is noninverted, said third track has odd horizontal scanning components, the phase of which is kept noninverted and even horizontal scanning components, the phase of which is inverted, and said fourth track has a phase which is inverted; and means for recording the output signals from said phase controlling means, so that said first to fourth tracks are recorded on respective video tracks of the recording medium.

8. The tracking control system according to claim 7, wherein said phase controlling means comprises:

first and second frequency dividing means which receive the vertical and horizontal synchronizing signals from said separating means, respectively;

an AND gate coupled to receive the outputs from said first and said second frequency dividing means;

third frequency dividing means coupled to receive the output from said first frequency dividing means;

an inverter connected to invert the output from said AND gate;

switching means for selectively producing the output from said AND gate and the output from said inverter in response to the output from said third frequency dividing means;

a local oscillator;

a phase shifter for inverting the phase of the output signal from the local oscillator; and frequency converting means for producing a chrominance information signal having a phase which is changed in a predetermined manner and a frequency which is converted to a lower frequency relative to said extracted chrominance information signal, including means for heterodyning said extracted chrominance information signal and one of the output from said local oscillator and the output from said phase shifter in response to the output from said switching means.

9. A tracking control system for a reproducing apparatus, comprising:

pickup means for producing a reproduction signal by detecting a signal recorded on a recording medium;

means for separating horizontal and vertical synchronizing signals from the reproduction signal from said pickup means;

phase controlling means coupled to receive the reproduction signal, for restoring the phase of a chrominance signal extracted from the reproduction signal to an original state, wherein the phase of the extracted chrominance signal has been changed from said original state to form four types of recording signals recorded correspondingly on first to fourth tracks of the recording medium, and wherein said first track has odd horizontal scanning components, the phase of which is inverted and even horizontal scanning components, the phase of which is kept noninverted, said second track has a phase noninverted, said third track has odd horizontal scanning components, the phase of which is kept noninverted and even horizontal scanning components, the phase of which is inverted, and said fourth track has a phase which is inverted;

delaying means coupled to said phase controlling means, for delaying the phase-restored chrominance information signal for one horizontal scanning period;

means for producing a reproducing signal by adding the restored chrominance information signal and the output from said delaying means;

subtracting means for subtracting the output of said delaying means from the restored chrominance information signal;

phase detector means for detecting the phase and the amplitude of the output from the subtracting means; and means for performing tracking correction of said pickup means in response to an output from said phase detector means.

10. The tracking control system according to claim 9, wherein said phase controlling means comprises:

first and second frequency dividing means coupled to receive the vertical and horizontal synchronizing signals from said separating means, respectively;

an AND gate coupled to receive outputs from said first and said second frequency dividing means;

an inverter for inverting the output signal from said AND gate;

switching means for selectively producing the output from said AND gate and the output from said inverter in response to a control signal which inverts at a timing of every two successive ones of said first to fourth recording signals;

a local oscillator;

a phase shifter for inverting the phase of the output signal from the local oscillator; and frequency converting means, including heterodyne detection means, for heterodyning the extracted chrominance signal and one of the output from said local oscillator and the output from said phase shifter in response to the output from said switching means.

11. A tracking control system for recording/reproducing apparatus, comprising:

video signal recording means including first separating means for separating horizontal and vertical synchronizing signals from an input video signal;

first phase controlling means for periodically and sequentially changing the phase of a chrominance information signal extracted from the input video signal and for producing corresponding output signals, the phase changing operation being performed in response to said horizontal and vertical synchronizing signals to form four types of recording signals to be recorded on corresponding first to fourth tracks which are periodically repeated in sequence every set of four video tracks on said recording medium, wherein said first track has odd horizontal scanning components, the phase of which is inverted and even horizontal scanning components, the phase of which is kept noninverted, said second track has a phase which is noninverted, said third track has odd horizontal scanning components, the phase of which is kept noninverted and even horizontal scanning components, the phase of which is inverted, and said fourth track has a phase which is inverted; and means for recording the output signals from said phase controlling means, so that said first to fourth tracks are recorded on respective video tracks of the recording medium; and video signal reproducing means including:

pickup means for producing a reproduction signal by detecting the signals recorded on the recording medium;

second separating means for separating horizontal and vertical synchronizing signals from the reproduction signal from said pickup means;

second phase controlling means coupled to receive the reproduction signal, for restoring the phase of the chrominance signal extracted from the reproduction signal to an original state, wherein the phase of the extracted chrominance signal has been changed by said first phase controlling means from said original state to form said four types of recording signals recorded correspondingly on said first to fourth tracks of the recording medium, said second phase controlling means being arranged to control the recording signals so that for said first track, the odd horizontal scanning components are phase inverted and the even horizontal scanning components are kept noninverted; said second track is kept noninverted; for said third track, the odd horizontal scanning components are kept noninverted and the even horizontal scanning components are phase inverted; and said fourth track is phase inverted;

delaying means coupled to said second phase controlling means, for delaying the phase-restored chrominance information signals for one horizontal scanning period;

means for producing a reproducing signal by adding the restored chrominance information signal and the output from said delaying means;

subtracting means for subtracting the output of said delaying means from the restored chrominance information signal;

phase detector means for detecting the phase and the amplitude of the output from the subtracting means; and means for performing tracking correction of said pickup means in response to an output from said phase detector means.

* * * * *